Sept. 26, 1950  A. KALITINSKY  2,523,376
VALVE CONSTRUCTION FOR FREE PISTON COMPRESSORS
Filed Jan. 28, 1944  5 Sheets-Sheet 1

INVENTOR
Andrew Kalitinsky
Charles A Warren
ATTORNEY

INVENTOR
Andrew Kalitinsky
Charles A. Warren
ATTORNEY

Sept. 26, 1950 A. KALITINSKY 2,523,376
VALVE CONSTRUCTION FOR FREE PISTON COMPRESSORS
Filed Jan. 28, 1944 5 Sheets-Sheet 4

INVENTOR
Andrew Kalitinsky
Charles A. Warren
ATTORNEY

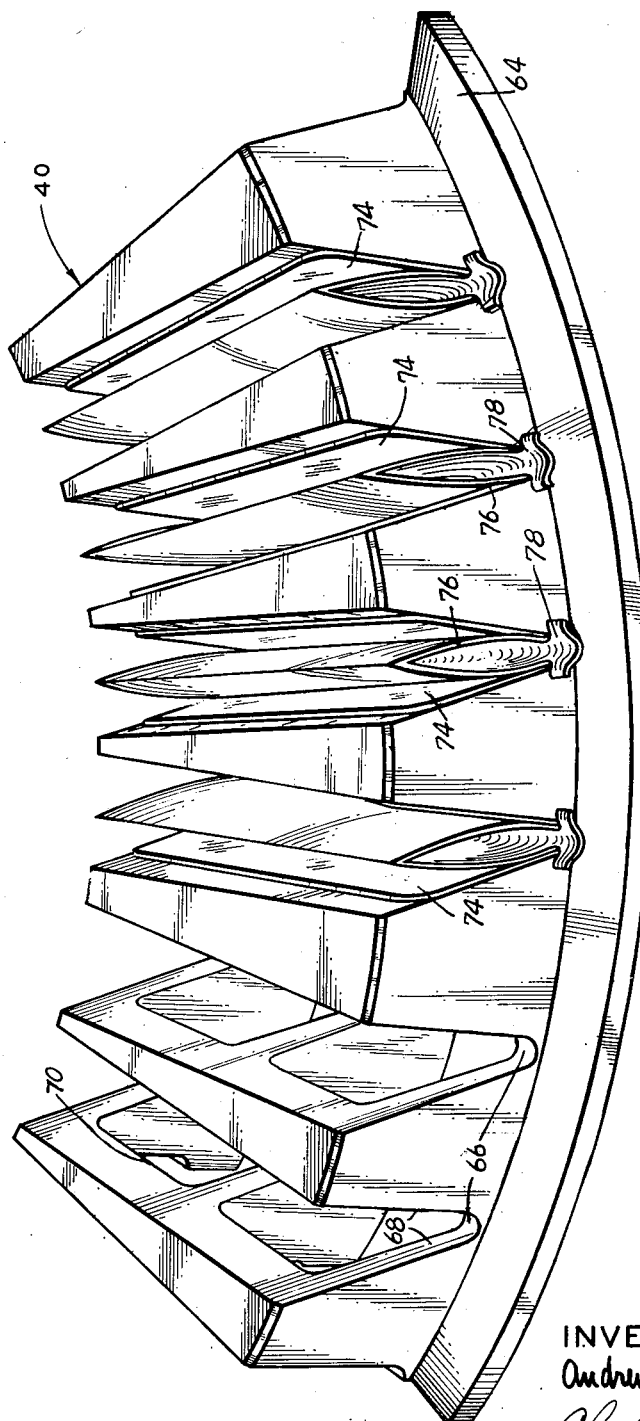

Patented Sept. 26, 1950

2,523,376

UNITED STATES PATENT OFFICE 2,523,376

VALVE CONSTRUCTION FOR FREE PISTON COMPRESSORS

Andrew Kalitinsky, Eagleville, Conn., assignor to United Aircraft Corporation, East Hartford, Conn., a corporation of Delaware Application January 28, 1944, Serial No. 520,059

2 Claims. (Cl. 230—56)

1

This invention relates to valves for air compressors.

In reciprocating compressors, the efficiency of the compressor is dependent to a great extent on the residual volume at the ends of the piston stroke. An object of this invention is to arrange the inlet and discharge valves of the compressor for a small residual volume.

A feature of this invention is an arrangement of the valves so that the flow of gas in and out of the reciprocating compressor is parallel to the axis of the compressor. In this way the gas flow is not impeded by being forced around corners and the power losses may be very low.

Another feature of this invention is the use of a flap valve so arranged as to cause no substantial change in the axial direction of the flow of gas through the valves.

Another feature is the grouping of the intake and discharge valves in the form of concentric rings in the heads of the compressor.

Other objects and advantages will be apparent from the specification and claims, and from the accompanying drawing which illustrates what is now considered to be a preferred embodiment of the invention.

Fig. 7 is a perspective view of a part of one ring of intake valves.

Figure 1:
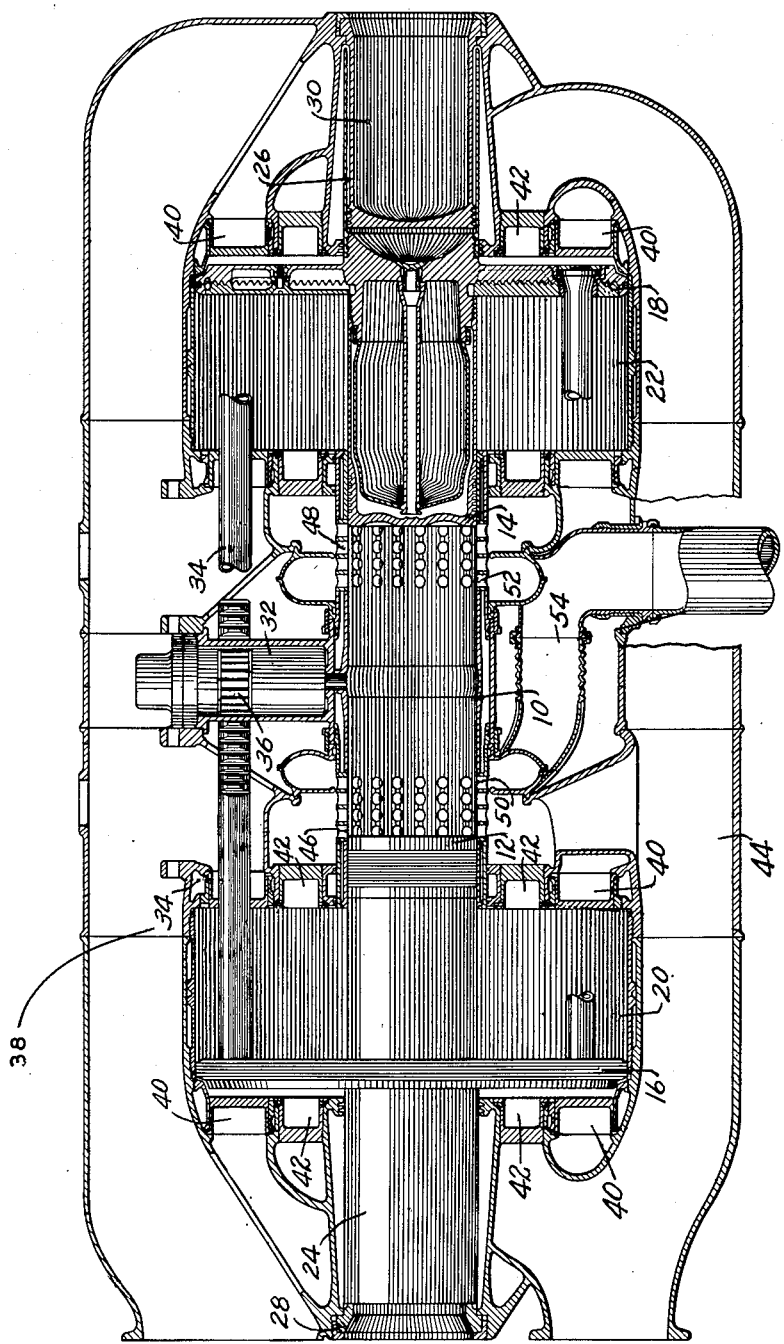
Fig. 1 is a sectional view through an engine-and-compressor unit incorporating the valves.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 by one or more devices 32. Air compressed in the air spring cylinders on the power stroke returns the piston assemblies. The piston assemblies are maintained always at equal distances

2 from the center of the engine cylinder by a linkage. This linkage may include rods 34 on the compressor pistons meshing with a pinion 36.

Intake manifold 38 conducts air to intake valves 40 through which air or gas alternately enters opposite ends of the compressor cylinders. The compressed air leaves the cylinders through discharge valves 42, also at opposite ends of the compressor cylinders, and passes through scavenge manifold 44 through ports 46 and 48 which are uncovered by pistons 12 and 14 at the end of the power stroke, thereby permitting air to be blown through the engine cylinder and exhaust ports 50 and 52 into exhaust manifold 54.

Figure 2:
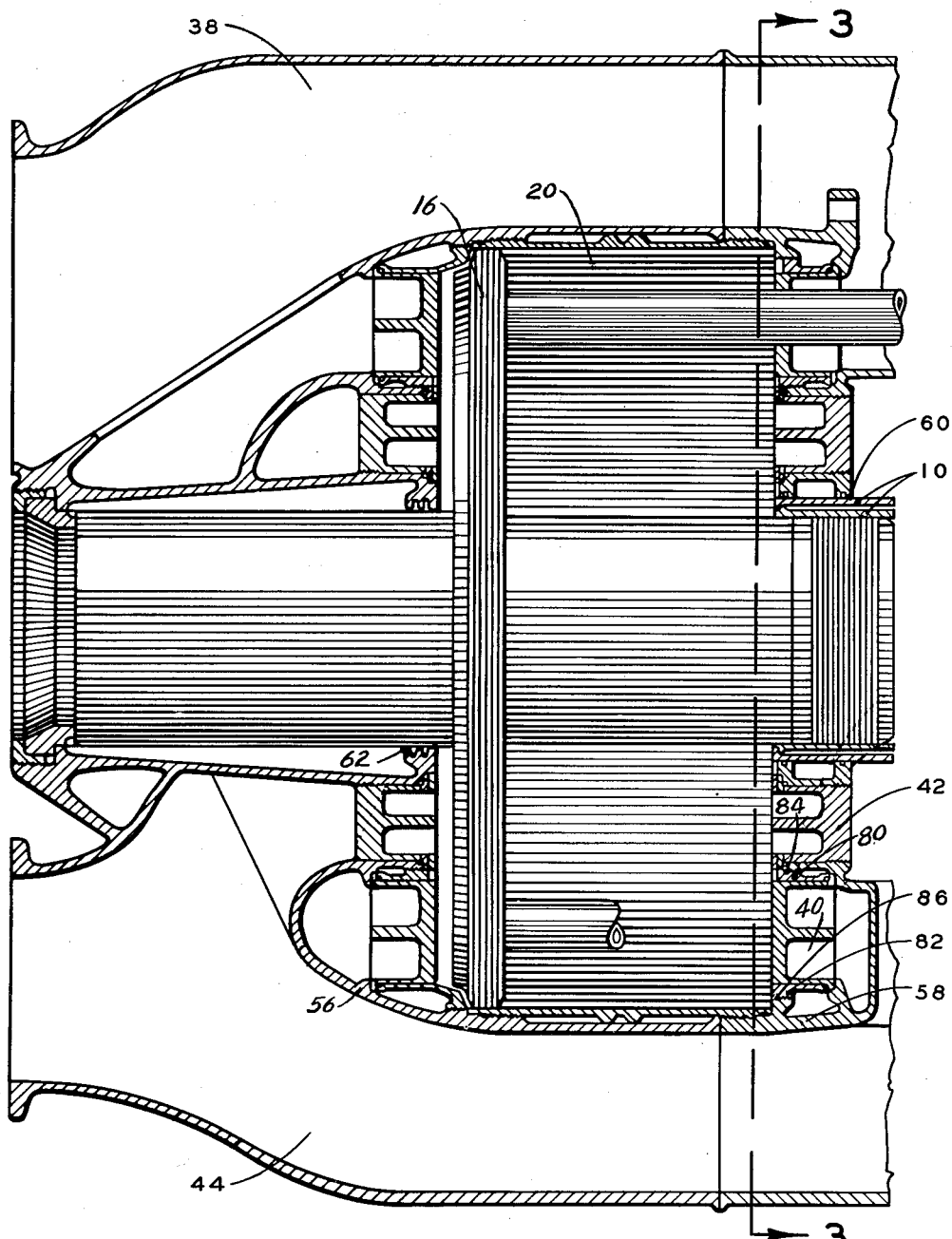
Fig. 2 is a sectional view on a larger scale of one compressor of the unit.

Each compressor cylinder 20 or 22 has outer and inner cylinder heads 56 and 58 in each of which both intake valves 40 and discharge valves 42 are located. Inner head 58, Fig. 2, has a central opening 60 for the engine cylinders 10 in which piston 12 is slidable. The outer head 54 has a central opening 62 for the air spring cylinder. The valves are arranged in concentric rings around the openings in the heads, and, in the construction shown, the rings of intake and discharge valves are similar. The inlet valves will be described in detail. Obviously, the intakes valves are mounted to permit gas flow in the direction opposite to the flow through the discharge valves.

Figure 3:
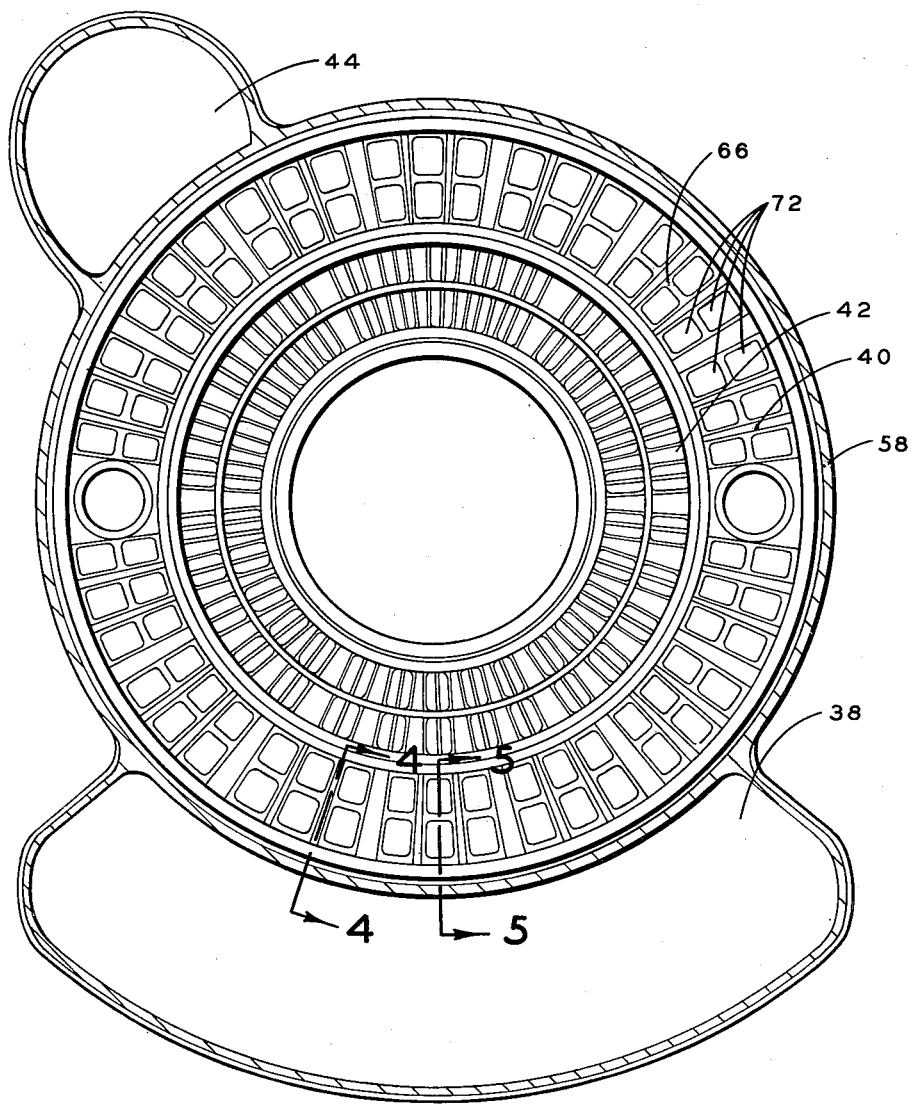
Fig. 3 is an inverted sectional view on line 3—3 of Fig. 2, the valve plates being shown only in the discharge valves.
Figure 4:
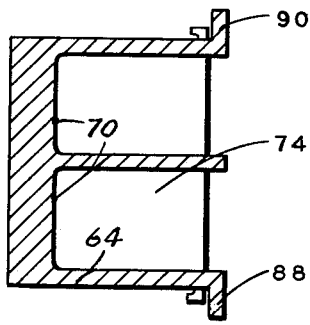
Fig. 4 is a sectional view on line 4—4 of Fig. 3, the valve plate and splitter vane being shown.
Figure 5:
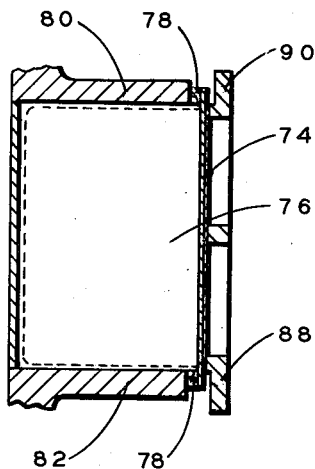
Fig. 5 is a sectional view on line 5—5 of Fig. 3, the valve plate and splitter vane being shown.
Figure 6:
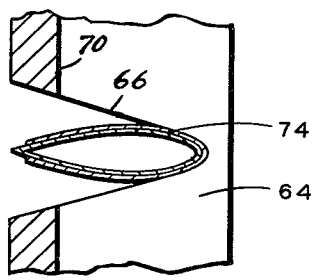
Fig. 6 is a sectional view at right angles to Fig. 5 showing a valve in open position.

The set of intake valves 40 includes a circular base 64 with a number of radial U-shaped grooves 66 therein. The opposite surfaces of each groove, which form valve seats 68 extend at acute angles to the axis of the compressor. One or more large circular slots 70 in the base intersect grooves 66 to form air passages 72, Fig. 3, in the base through which gas flows in a direction parallel to the compressor axis. Seats 68 surround the passages 72.

Each groove 66 receives a substantially U-shaped valve plate 74, the legs of which engage the valve seats 68 and close the air passages. The valve plates are clamped in the base of grooves 66 by splitter vanes 76 having projecting lugs 78 adjacent their leading edges to be engaged by clamping rings 80 and 82 on opposite sides of base 64. These rings may be threaded to engage threads 84 and 86 on the cylinder head 58.

The rings clamp the splitter vanes and the valves tightly in the bases of the slots. Base 64 may have integral projecting flanges 88 and 90 for locating the valve structure in head 58.

As compressor piston 16 moves away from the center of the engine, gas is drawn through intake valves 40, each valve plate 74 bending away from its valve seat and against the surface of the splitter vane. By this valve construction, gas flows in a straight line through the valve in a direction parallel to the axis of the compressor. When compressor piston 16 stops, the valve plates move against the seats by their elasticity and close the gas passages through the valves.

The discharge valves 42 which are similar in construction to the intake valves, but face in the opposite direction, are opened to discharge gas when the piston is moving toward the valves. Thus, the flow of gas through both sets of valves is linear and parallel to the compressor axis.

It is to be understood that the invention is not limited to the specific embodiment herein illustrated and described, but may be used in other ways without departure from its spirit as defined by the following claims.

I claim:

1. A compressor construction including a cylinder, a piston in said cylinder, a head on one end of the cylinder and concentric rings of intake and discharge valves in said head, each ring of valves comprising an annular base member having a plurality of radially extending U-shaped grooves projecting axially inward from one side surface of the base member with the side surfaces of the grooves extending at an acute angle to the axis of the compressor, annular grooves extending axially inward from the opposite side surface and intersecting the radial grooves to form gas passages axially through the member with the surfaces of the radial grooves forming valve seats surrounding the gas passages, U-shaped valves in the radial grooves, and means for clamping the base of each valve in the base of the associated grooves with the edges of the side surfaces of the valves free to move away from the seats for the flow of air in an axial direction through the compressor head.

2. In a free piston compressor, a compressor cylinder, a piston within said cylinder and having a projecting element at one end thereof, a cylinder head on the cylinder having a centrally located opening to receive the projecting element on the piston, and concentric sets of air valves in the head and arranged in a ring around said opening, each set of valves comprising an annular base member having a plurality of radially extending U-shaped grooves projecting axially inward from one side surface of the base member with the side surfaces of the grooves extending at an acute angle to the axis of the compressor, annular grooves extending axially inward from the opposite side surface and intersecting the radial grooves to form gas passages axially through the member with the surfaces of the radial grooves forming valve seats surrounding the gas passages, U-shaped valves in the radial grooves, and means for clamping the base of each valve in the base of the associated groove with the edges of the side surfaces of the valves free to move away from the seats for the flow of air in an axial direction through the compressor head.

ANDREW KALITINSKY.

REFERENCES CITED

The following references are of record in the file of this patent:

UNITED STATES PATENTS

| Number | Name | Date |
|---|---|---|
| 1,980,997 | Jenkins | Nov. 20, 1934 |
| 1,996,762 | Halleck | Apr. 9, 1935 |
| 2,000,735 | Arnold | May 7, 1935 |
| 2,016,613 | Pescara | Oct. 8, 1935 |
| 2,075,133 | Pescara | Mar. 30, 1937 |
| 2,199,307 | Eichelberg | Apr. 30, 1940 |
| 2,213,256 | Paget | Sept. 3, 1940 |
| 2,408,056 | Farmer | Sept. 24, 1946 |

FOREIGN PATENTS

| Number | Country | Date |
|---|---|---|
| 496,795 | Great Britain | Dec. 6, 1938 |